US012036751B2

(12) United States Patent
Ogale et al.

(10) Patent No.: US 12,036,751 B2
(45) Date of Patent: Jul. 16, 2024

(54) METHODS AND APPARATUS FOR MANUFACTURING A THERMOPLASTIC STRUCTURE

(71) Applicant: The Boeing Company, Chicago, IL (US)

(72) Inventors: Amol Ogale, Munich (DE); Randall Dow Wilkerson, O'Fallon, MO (US); Alexander Rubin, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/936,375

(22) Filed: Sep. 28, 2022

(65) Prior Publication Data

US 2024/0100784 A1   Mar. 28, 2024

(51) Int. Cl.
*B29C 70/08* (2006.01)
*B29C 70/32* (2006.01)
*B64F 5/10* (2017.01)
*B29L 31/30* (2006.01)

(52) U.S. Cl.
CPC ............ *B29C 70/085* (2013.01); *B29C 70/32* (2013.01); *B64F 5/10* (2017.01); *B29L 2031/3076* (2013.01)

(58) Field of Classification Search
CPC .................................................. B29C 70/085
See application file for complete search history.

(56) References Cited

U.S. PATENT DOCUMENTS

| 4,657,795 | A | * | 4/1987 | Foret ...................... B62K 19/16 |
| | | | | 428/36.1 |
| 4,883,552 | A | * | 11/1989 | O'Connor ............. B29C 70/525 |
| | | | | 264/281 |
| 4,976,812 | A | * | 12/1990 | McConnell ............. B29C 53/68 |
| | | | | 87/9 |
| 5,055,242 | A | * | 10/1991 | Vane ........................ D04H 3/04 |
| | | | | 264/171.11 |
| 5,132,070 | A | * | 7/1992 | Paul ........................ B29C 70/52 |
| | | | | 264/258 |
| RE35,081 | E | * | 11/1995 | Quigley .............. B63B 15/0083 |
| | | | | 428/36.1 |
| 5,492,583 | A | * | 2/1996 | Fingerson ................. B05C 3/12 |
| | | | | 425/114 |
| 2006/0211511 | A1 | | 9/2006 | Cheng |
| 2008/0229921 | A1 | * | 9/2008 | Head ........................ D04C 3/48 |
| | | | | 87/8 |
| 2016/0194468 | A1 | * | 7/2016 | Ogasawara ............. B29B 15/08 |
| | | | | 524/495 |

FOREIGN PATENT DOCUMENTS

DE     102010015021 A1    10/2011
DE     102011011577 A1 *   4/2012
EP        0449779 A2 *     3/1991

OTHER PUBLICATIONS

Extended European Search Report, Application No. 23190067.1 dated Jan. 31, 2024, 7 pages.

* cited by examiner

*Primary Examiner* — Jeffry H Aftergut
(74) *Attorney, Agent, or Firm* — Jordan IP Law, LLC

(57) ABSTRACT

Methods and apparatus for manufacturing a thermoplastic structure include laying a first plurality of braided plies on a mandrel, and laying one or more unidirectional plies on the plurality of braided plies. A second plurality of braided plies is laid on the one or more unidirectional plies. The layup thereby forms a thermoplastic structure having combined braided and unidirectional plies.

20 Claims, 10 Drawing Sheets

METHODS AND APPARATUS FOR MANUFACTURING A THERMOPLASTIC STRUCTURE

BACKGROUND

Different techniques can be used to form plastic products, such as fabricating thermoplastic panels for aircraft using a thermoplastic composites (TPC) manufacturing process. For example, aircraft are being designed and manufactured with greater percentages of composite materials to decrease the weight of the aircraft. This decreased weight improves performance features such as payload capacity and fuel efficiency. Further, composite materials provide longer service life for various components in the aircraft.

When manufacturing composite structures, layers of composite material are typically laid or stacked on a tool. For example, layers of fiber sheets pre-impregnated with polymer resin (known as "prepreg") can be laid on the tool, which then form the composite end product. That is, the stacked layers are subsequently processed to form a consolidated composite structure.

While the use of thermoplastic composites can enhance performance of a structure at a lower weight, making complex shapes using TPC is very difficult with existing layup and consolidation processes. As such, the time and cost of performing TPC manufacturing, such as using metallic materials or thermoset resin based carbon composites for the manufacturing of complex shaped parts in aircraft applications, is increased. For example, known composites manufacturing processes to produce non-standard parts include thermoplastic process steps that are costly and very time consuming.

SUMMARY

The disclosed examples are described in detail below with reference to the accompanying drawing figures listed below. The following summary is provided to illustrate examples disclosed herein. It is not meant, however, to limit all examples to any particular configuration or sequence of operations.

Certain examples provide a method for manufacturing a thermoplastic structure that includes laying a first plurality of braided plies on a mandrel and laying one or more unidirectional plies on the plurality of braided plies. The method further includes laying a second plurality of braided plies on the one or more unidirectional plies.

In some examples, a thermoplastic preform structure includes a first plurality of braided plies and one or more unidirectional plies laid on the plurality of braided plies. A second plurality of braided plies are laid on the one or more unidirectional plies.

In some examples, a system for constructing a thermoplastic structure includes a mandrel and a machine comprising one or more tools configured to construct a plurality of layers of plies to form a thermoplastic preform structure on the mandrel. The machine is configured to lay a first plurality of braided plies on the mandrel, lay one or more unidirectional plies on the plurality of braided plies, and lay a second plurality of braided plies on the one or more unidirectional plies.

The features, functions, and advantages that have been discussed are achieved independently in various examples or are to be combined in yet other examples, further details of which are seen with reference to the following description and drawings.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

Corresponding reference characters indicate corresponding parts throughout the drawings.

DETAILED DESCRIPTION

Figure 1:
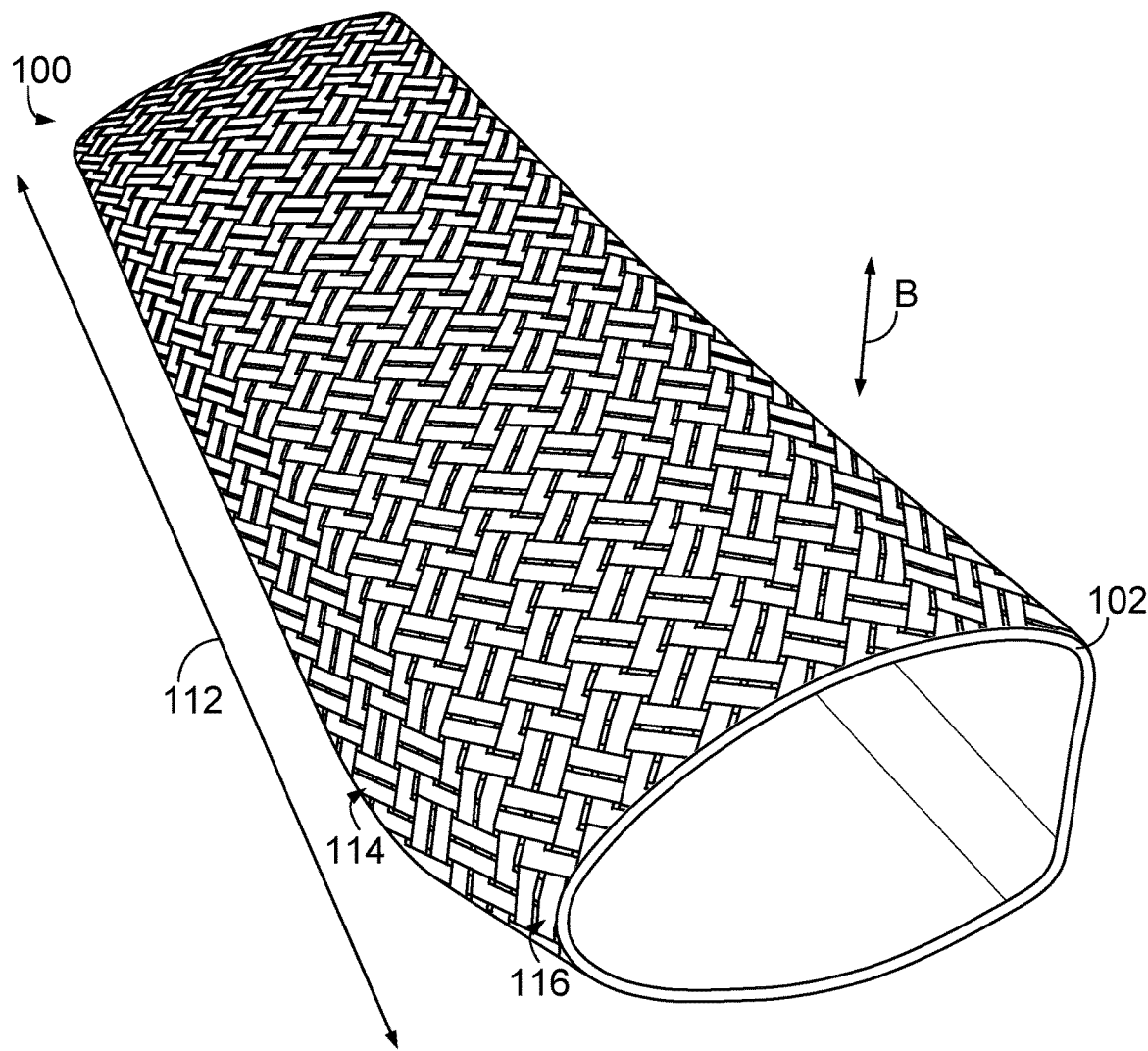
FIG. 1 is an illustration of a portion of a rotor blade fabricated in accordance with an implementation.

The foregoing summary, as well as the following detailed description of certain embodiments, implementations, and examples will be better understood when read in conjunction with the appended drawings. As used herein, an element or step recited in the singular and preceded by the word "a" or "an" should be understood as not necessarily excluding the plural of the elements or steps. Further, references to "one" embodiment, implementation, or example are not intended to be interpreted as excluding the existence of additional embodiments, implementations, or examples that also incorporate the recited features. Moreover, unless explicitly stated to the contrary, embodiments, implementations, and examples "comprising" or "having" an element or a plurality of elements having a particular property can include additional elements not having that property.

While various spatial and directional terms, such as "top," "bottom," "upper," "lower," "vertical," and the like are used to describe embodiments, implementations, and examples, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

As described herein, various implementations provide a TPC manufacturing process, particularly for manufacturing parts having geometrically complex closed profiles (e.g., helicopter rotor blades). Some examples combine a braiding layup and unidirectional tape to create a layup at high rate and reduced layup cost and material wastage. In one example, consolidation of TPC using bladder molding techniques facilitates producing a complex component in a "one shot TPC" that also supports welding or joining processes (e.g., metal-TPC, TPC-TPC joining, etc.). In some implementations, layers or plies include bi-axial braided plies and unidirectional plies. That is, a combination of bi-axial braided plies and unidirectional plies form the layup, such as for a thermoplastic preform (e.g., layer of plies laid up in a preformed configuration or shape). In one or more implementations, locally placed unidirectional patches and/or bi-axial braided patches are used in combination with bi-axial braided circumferential plies (e.g., wound tubular braiding).

Figure 2:
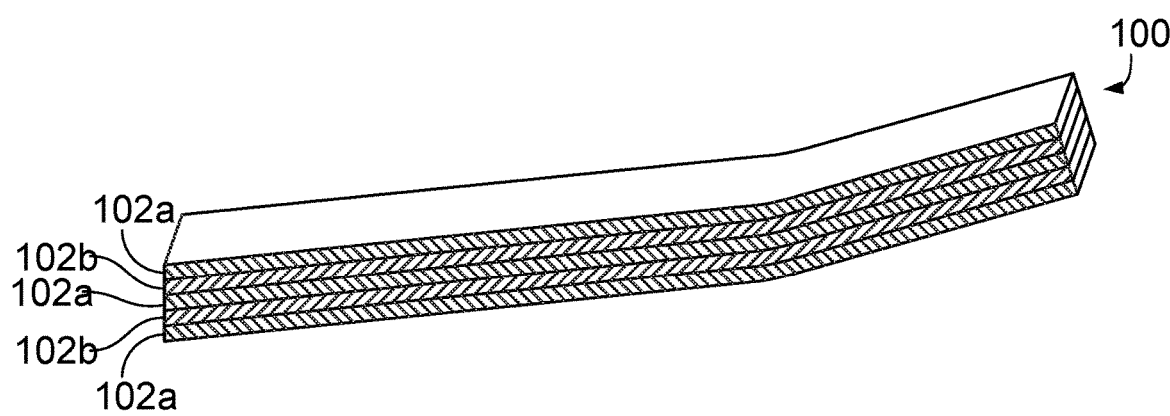
FIG. 2 is an illustration of a portion of stack up having multiple layers.

One or more examples allow for fabrication of thermoplastic composite parts, such as thermoplastic aircraft parts as shown in FIG. 1 illustrating a rotor blade 100 for a helicopter. The rotor blade 100 is formed from a plurality of layers 102 comprised of different types of plies, namely layers 102a of braided plies and layers 102b of unidirectional plies (a configuration of a stack up or layup 120 having multiple layers 102 is shown in FIG. 2). That is, the rotor blade 100 is formed from a layup in some examples that is a multilayer structure having different types of ply layers.

It should be noted that although the layup 120 is shown having alternating layers 102a, 102b of braided plies and unidirectional plies, any arrangement can be provided. For example, a plurality of braided plies forming a first plurality of layers 102a can be separated by another plurality of braided plies forming a second plurality of layers 102b separated by one or more unidirectional plies forming one or more layers 102b. That is, any number of layers 102a, 102b can form a layup, wherein the positioning of the layers 102a, 102b within the layup can be varied as desired or needed. The number of each of the layers 102a, 102b in the layup 120 can be the same or different, as well as arranged/stacked in a symmetrical or asymmetrical pattern. For example, symmetric could be layers arranged/stacked as follows: 102a, 102b, 102a, 102b and finally 102a or 102a, 102a, 102b, 102a and finally 102a, while asymmetric could be layers arranged/stacked as follows: 102a, 102b, 102a, 102a and finally 102a or something similar. While 5 plies are shown, any number of plies could be in the laminate). It should be noted that one or more of the layers 102a, 102b extend less than the entire length 112 of the of the rotor blade 100. In some implementations, one or more of the layers 102b of unidirectional plies are arranged along only a portion of the length or width of the part. For example, one or more of the layers 102b of unidirectional plies are arranged at locations where increased strength in the part is desired or needed (e.g., transition sections). However, in the various examples, the configuration of the layers 102a, 102b in the layup are symmetric with respect to the central axis of the part.

In some examples, the plurality of braided plies forming the plurality of layers 102a are formed using bi-axial braiding in the x-orientation 114 and y-orientation 116 (e.g., +/− in the x-direction and the y-direction). However, other configurations and orientations are contemplated.

Figure 3:
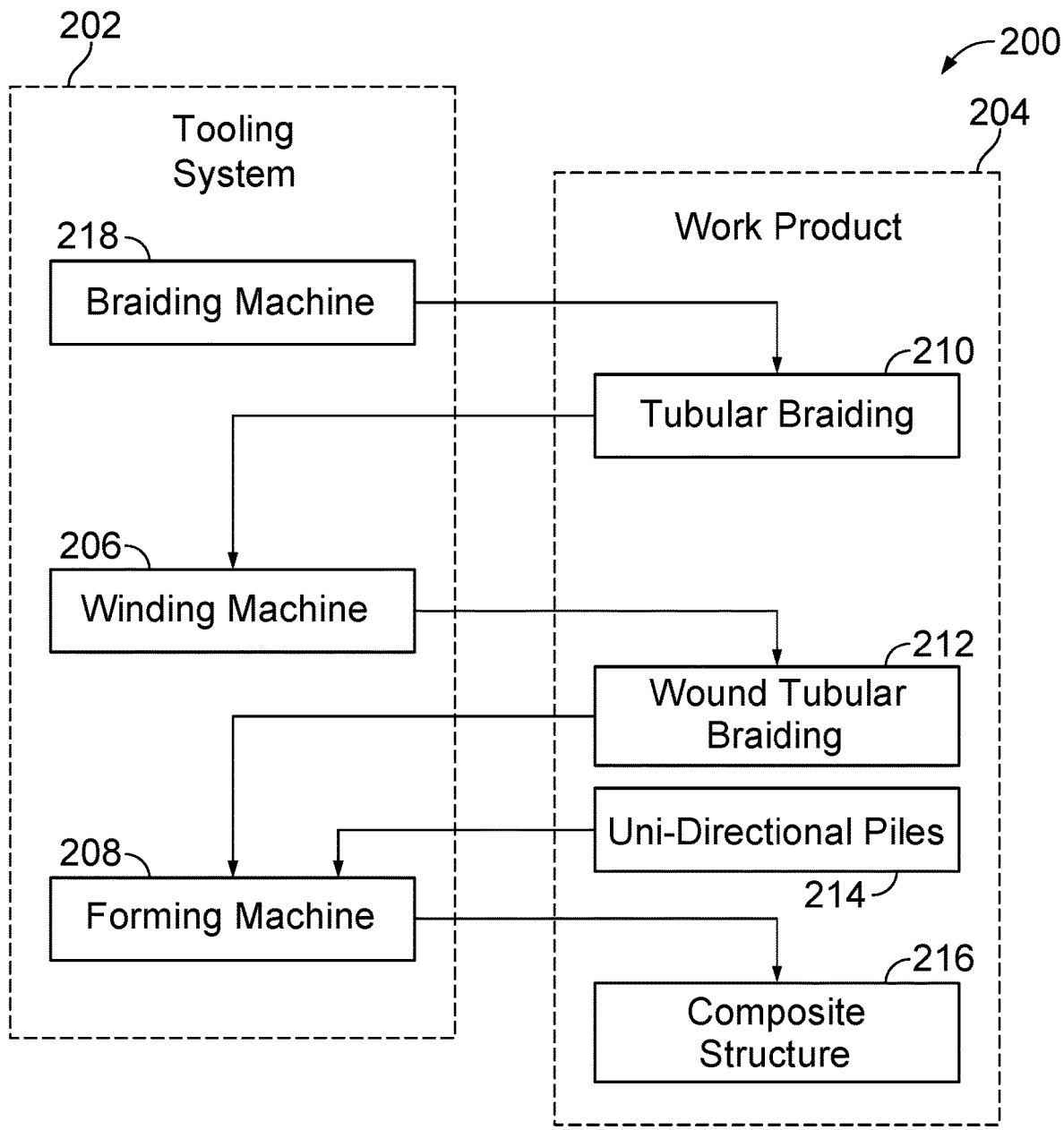
FIG. 3 is a block diagram of a system for constructing a composite structure in accordance with an implementation.

In one example, a system 200 for constructing a composite structure as illustrated in FIG. 3 includes a braiding machine 218, a winding machine 206 and a forming machine 208. In one example, the composite structure is constructed of a combination of wound tubular braiding, such as braided plies as described herein, and unidirectional plies. The system 200 generally includes tooling system 202 and a work product 204 upon which the tooling system 202 interacts. The tooling system 202 includes the braiding machine 218, the winding machine 206, and the forming machine 208. The work product 204 includes a tubular braiding 210, a wound tubular braiding 212, unidirectional plies 214, and a composite structure 216. The wound tubular braiding 212 is also referred to as a winding of tubular braiding and can take different tubular shapes (e.g., hollow structures having different shapes or profiles). The tubular braiding 210 is formed by the braiding machine 218. The wound tubular braiding 212 is formed by the winding machine 206 from the tubular braiding 210. The composite structure 216 is formed by the forming machine 208 from the wound tubular braiding 210 and unidirectional plies 214 (e.g., unidirectional tape cut from a roll of prepreg, including other reinforcement materials that have been pre-impregnated with either a thermoplastic or thermoset resin). The composite structure 216 is any structure, such as one that requires a specific fiber orientation and lay up to meet design requirements. For example, the composite structure 216 is one or more parts for an aircraft or helicopter, such as a rotor blade, in some examples (while the preform of the layup is tubular, the tubular preform could also be flattened into a flat laminate and used to form other structures such as frames or stringers from the flattened tubular preform). As should be appreciated, the tooling system 202 in some examples includes other machines or components, such as molding or post-processing machines, cutting devices, etc. used in thermoplastic structure manufacturing. These machines or components are not shown for ease in illustration.

Figure 4:
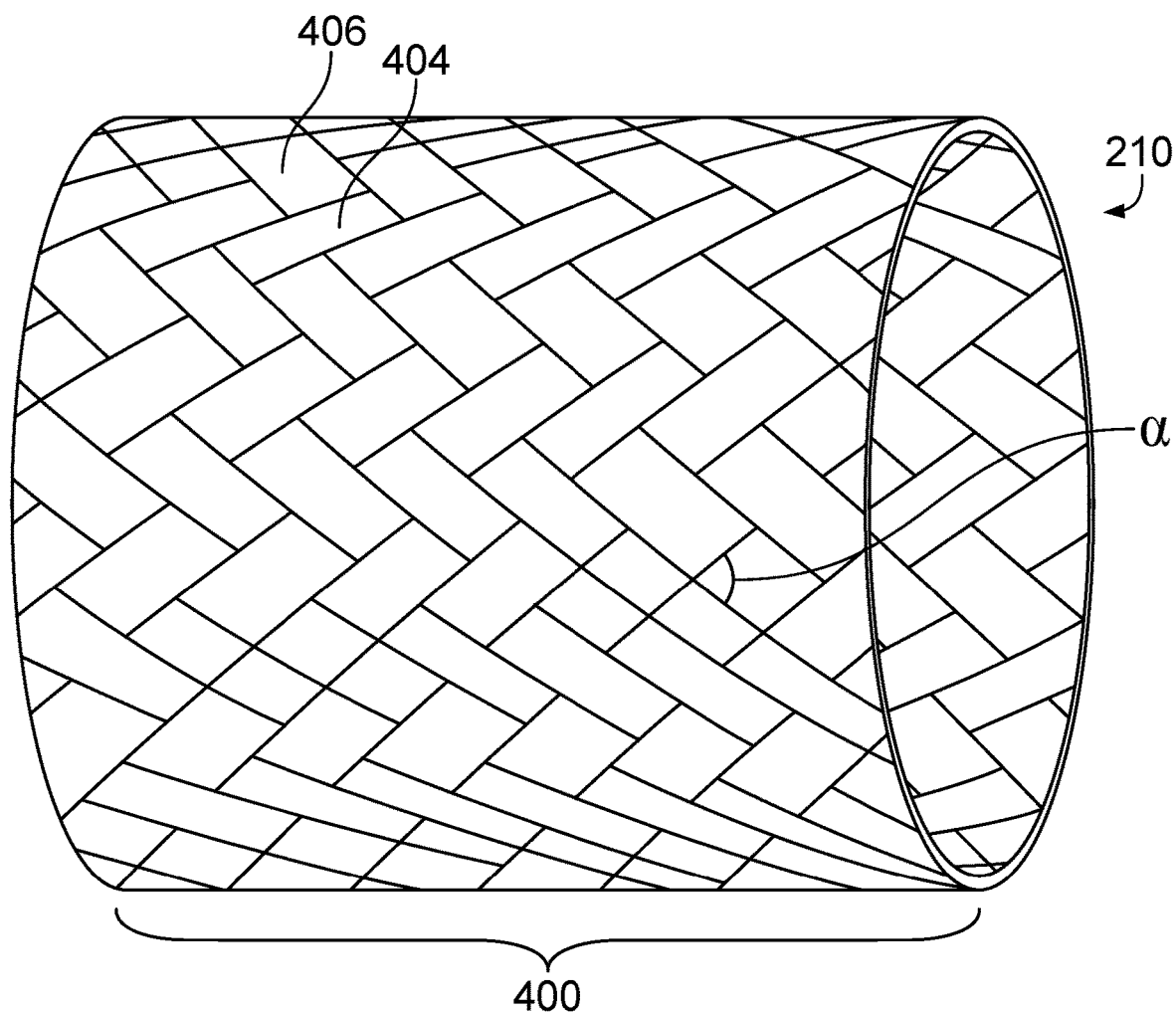
FIG. 4 is an illustration of a bi-axial braid in accordance with an implementation.
Figure 5:
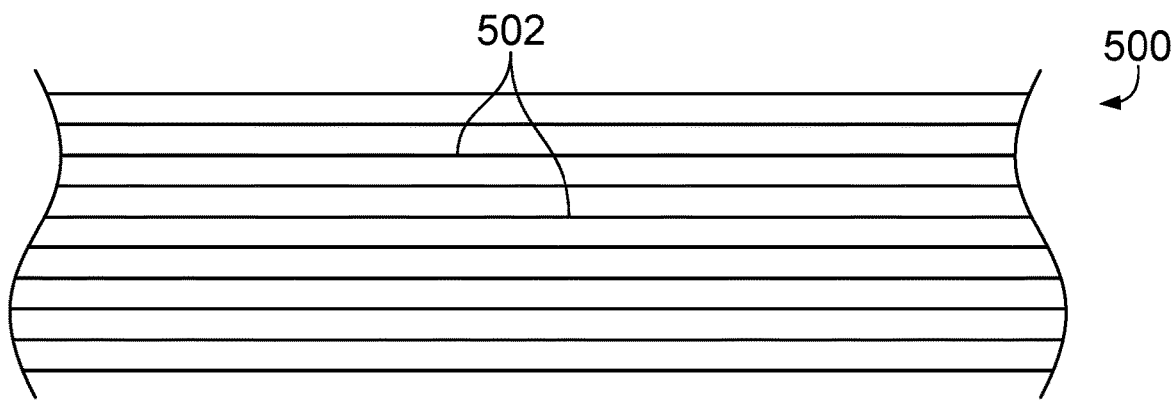
FIG. 5 is an illustration of unidirectional tape in accordance with an implementation.

In some examples, the a plurality of layers 102 comprised of the different types of plies, namely the layers 102a of braided plies and layers 102b of unidirectional plies are from a braided arrangement as shown in FIG. 4 and a non-braided arrangement shown in FIG. 5 (e.g., formed from side-by-side arranged unidirectional tape where the fibers in the ply are parallel). The orientation of the fibers here appear to be at 0 degrees, but could be at +45 degrees or −45 degrees or at 90 degrees), respectively. That is, in some examples, the layers 102a of braided plies are formed from braiding of unidirectional plies. However, any form-fiber orientation of braided plies can be used as long as the fibers in the ply are parallel.

With particular reference to FIGS. 4 and 5, the braided layer is formed by a branding process, such as to form the tubular braiding 210. In the illustrated example, the tubular braiding 210 includes a biaxial braid 400. In the biaxial braid 400, a matrix of elements (e.g., unidirectional elements, such as the tows 500 arranged unidirectionally and having unidirectional fibers 502). The tows 500 are interwoven or braided to form a matrix of orthogonal parallel elements 404 disposed at a bias angle (a) to the orthogonal parallel elements 406. The bias angle a is determined, for example, based on the specific application, wherein steeper braid angles result in increased flexibility and/or an increased ability to conform to contours. It should be noted that the elements 404 and 406 can be formed of any suitable material.

With reference now to FIG. 5, the non-braided tows 500 are configured as a single tow/tape with a plurality of the unidirectional fibers 502 in a continuous strip held together by thermal or adhesive bonding in some examples. The unidirectional fibers 502 are parallel with one another. The unidirectional fibers 502 in one examples are pre-impregnated with a resin. The resin can be, for example, a thermoplastic such as polyphenylene sulfide (PPS), polyether ether ketone (PEEK), polyether ketone ketone (PEKK), etc. However, it should be appreciated that the resin can be a thermoset resin such as, for example, epoxy, cyanate ester, etc. The unidirectional fibers 502 are held together, such as tacked together with prepreg resin (not shown) in some examples. The unidirectional tows 500 can be constructed, for example, of a slit-tape thermoplastic, a thermoset tape that is substantially tack-free at room temperature, a bindered dray roving prepreg wherein an epoxy or thermoplastic binder is applied, a substantially tack-free thermoset prepreg, or a low tack thermoset prepreg.

With reference again to FIG. 2, in some examples, the work product 204 includes additional variations of the tubular braiding 210, wound tubular braiding 212, unidirectional plies 214, and composite structure 216. For example, in some examples, braided material patches (e.g., braided patches 720 shown in FIG. 7) or unidirectional material patches (e.g., unidirectional patches 718 shown in FIG. 7) are positioned on the wound tubular braiding 212, such as in a transition section of the part as described in more detail herein.

The system 200 can be employed in the context of aircraft manufacturing and service, as will be described below. For example, the system 200 can be used in component and subassembly manufacturing of an aircraft or other vehicle including an airframe and interior, system integration of the aircraft, and routine maintenance and service of the aircraft.

Figure 6:
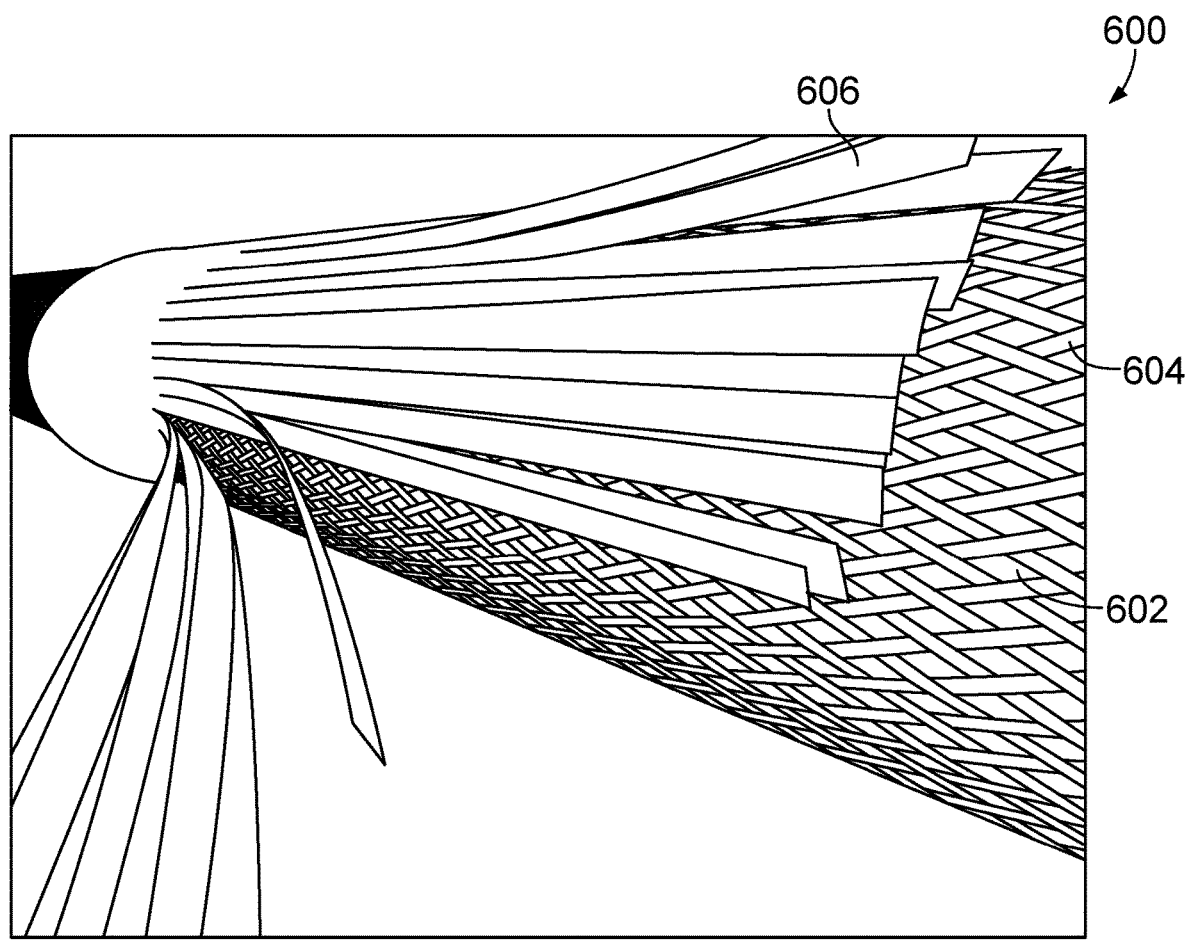
FIG. 6 is an illustration of a partially manufactured preform in accordance with an implementation.

Thus, various examples manufacture a thermoplastic structure with successively braided and unidirectional plies, such as over a mandrel, for a geometrically complex part, with tight radii and transition sections (e.g., helicopter propeller blade). In one example, a manufacturing method combines braided and unidirectional thermoplastic structure prepreg thermoplastic material. That is, various examples are implementable using tackier prepreg thermoplastic material (whereas other methods are implementable with thermosets, such as using triaxial braiding). In some examples, the braid and interleave unidirectional plies can be flattened to form a solid formable laminate such as for frames and or stringer. FIG. 6 illustrates a partially manufactured preform 600 according to an example. As can be seen, layers of braided material 602 are provided (e.g., laid or wound) on a mandrel 604 (visible through the braiding as viewed in FIG. 6). For example, one implementation includes laying two or more layers of braided material 602 on the mandrel 604. On top of the layers of braided material 602 are unidirectional plies 606 (e.g., zero degree plies). That is, in the illustrated implementation the unidirectional plies 606 are laid on the mandrel 604 over the layers of braided material 602. It should be appreciated that the partially manufactured preform 600 is shown merely to illustrate the different layers that form the combined braided and unidirectional thermoplastic structure. Different configurations are contemplated as described herein, including different numbers of the various layers, different laying of the various layers, etc.

Figure 7:
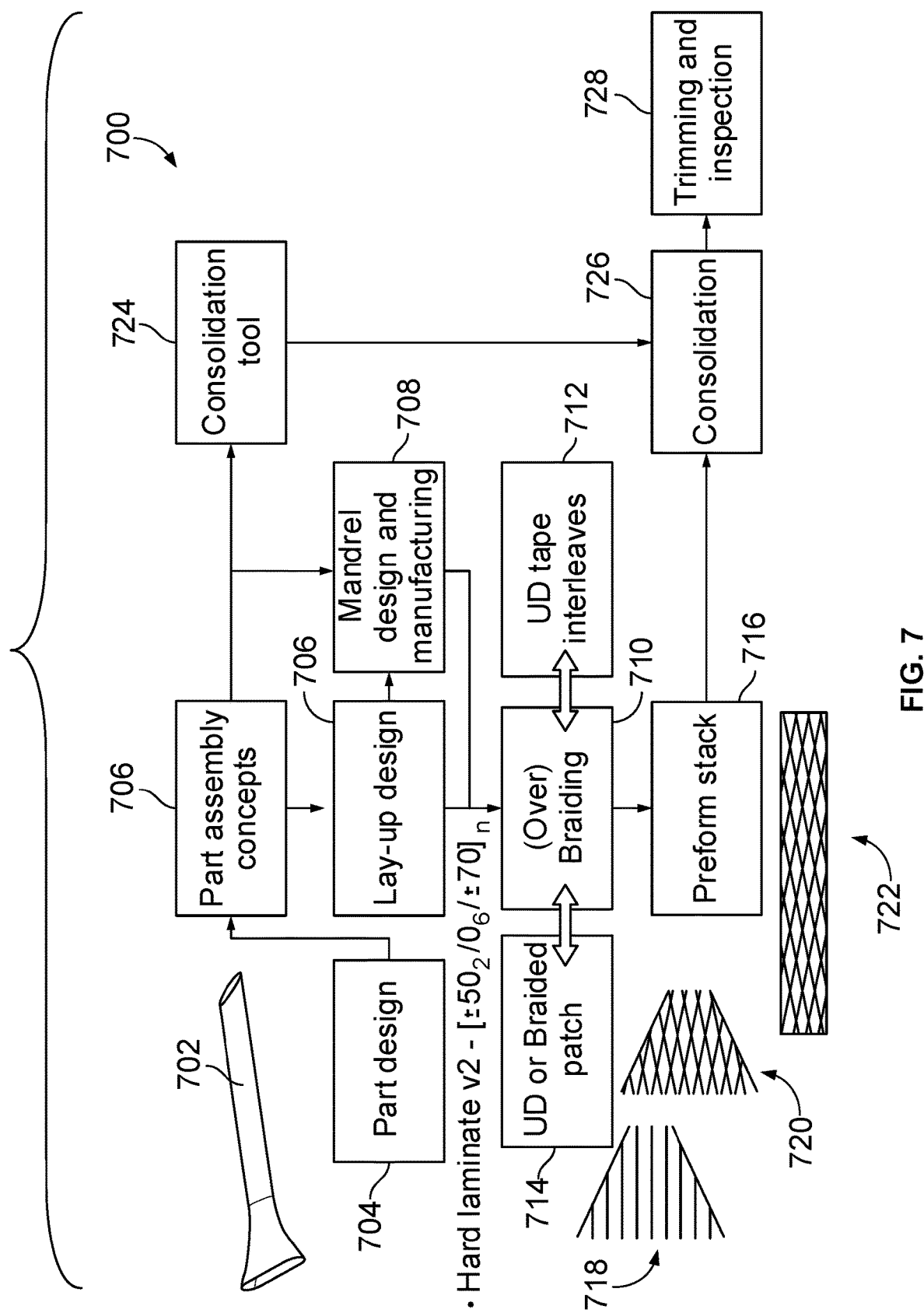
FIG. 7 is a block diagram of a process flow for manufacturing a thermoplastic structure in accordance with an implementation.

One example of a process flow 700 for manufacturing a thermoplastic structure 702 is illustrated in FIG. 7. As can be seen, the process flow 700 begins with a part design at 704. For example, the design of an aircraft part is defined, such as the specifications, requirements, parameters, etc. for the aircraft part, which then is formed as the thermoplastic structure 702. That is, the part design defines the thermoplastic structure 702 to be manufactured.

The design portion of the process flow 700 continues at 706 with a parts assembly concepts step. For example, in this step, specifications for the assembly of one or more parts using the thermoplastic structure 702 are developed. As should be appreciated, the design steps at 704 and 706 are performed in accordance with any suitable thermoplastic manufacture methods. That is, the design steps at 704 and 706 are performed using one or more design techniques or methods in the thermoplastic manufacture technology area.

The process flow 700 includes a layup design at 706 and a mandrel design and manufacturing at 708. For example, the ply layup configuration and mandrel type are defined at 706 and 708, respectively. In some examples, the layup design at 706 includes defining the configuration or order (and number of) layers of braided material 602 and unidirectional plies 606 on the mandrel 604 (all shown in FIG. 6). The mandrel design and manufacturing can include different types of mandrels, such as a multi-part or segmented mandrel as described in more detail herein (e.g., a segmented mandrel for near-net shaped thermoplastic forming).

The process flow 700 forms a preform stack at 716 based on the layup design, which includes layers of braided material formed by braiding at 710 in combination (e.g., stacked) with unidirectional plies, such as unidirectional tape interleaves at 712 and/or unidirectional or braided patches at 714. That is, the preform stack at 716 is formed from a combination of plies or plies and patches. It should be noted that the patches in some examples include one or more unidirectional patches 718 and/or one or more braided patches 720 that are stacked or positioned on one or more braided layers 722. For example, the patches 718, 720 can be smaller plies that form a ply stack up over a limited portion of the preform. In some examples, the patches 718, 720 are pre-kitted and placed as multiple ply additions (e.g., pre-kitted unidirectional ply(s) placed by hand upon a braided preform or a mandrel prior to braiding). In one example, the one or more unidirectional patches 718 and/or one or more braided patches 720 have a material structure the same as the layers of braided material 602 and unidirectional plies 606 (e.g., the type of fiber, type of resin, orientation of the fibers, etc. can be the same). As should be appreciated, the number and arrangement of the plies and patches is varied as desired or needed in different implementations (e.g., the part to be manufactured).

The process flow 700 then provides forming steps including use of a consolidation tool 724 to perform consolidation at 726. That is, the preform stack formed at 716 is consolidated using a consolidation tool (e.g., the forming machine 208 shown in FIG. 2). That is, the layered plies on the mandrel are consolidated to form the thermoplastic structure 702 (e.g., the composite structure 216 shown in FIG. 2). Trimming and inspection is then performed at 728. For example, the thermoplastic structure 702 is trimmed to specification and inspected to produce a final part (e.g., a rotor blade, etc., such as a helicopter propeller blade).

Figure 8:
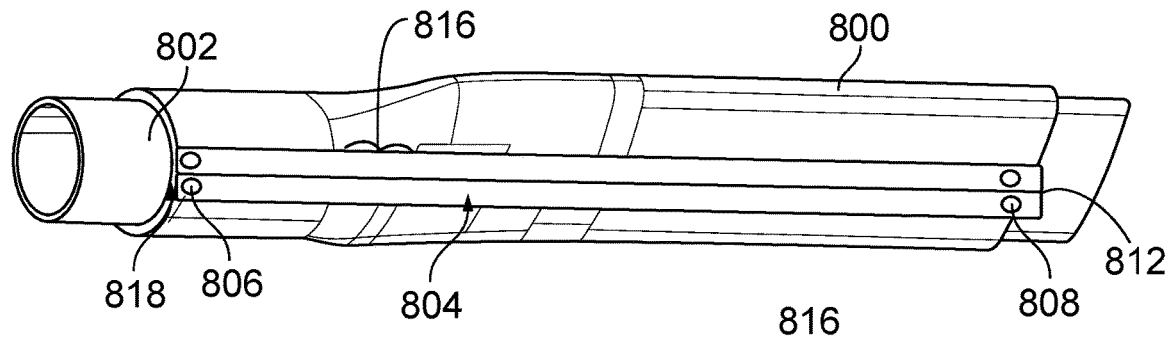
FIG. 8 illustrates a portion of a thermoplastic preform with unidirectional tape in accordance with an implementation.
Figure 9:
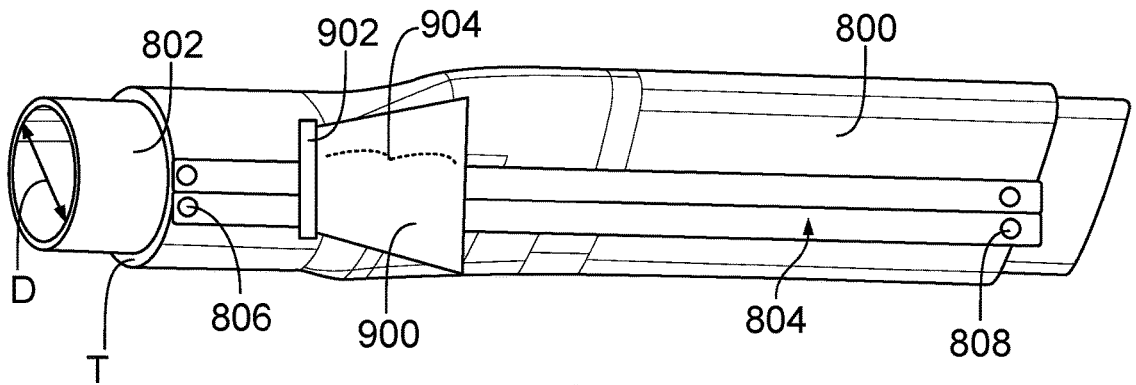
FIG. 9 illustrates a portion of a thermoplastic preform with unidirectional tape and a patch in accordance with an implementation.

In various examples, the manufacture or forming of a thermoplastic preform, such as the preform stack formed at 716 results in an improved final part, namely, a more robust and form fitting part, such as for parts having tight radii and transition sections. In one example, and with reference to FIGS. 8 and 9, the thermoplastic preform is manufactured as follows:

1. Forming a layup by repeating the following steps:
   a. Lay two or more layers 800 of braided material over a mandrel 802 (e.g., biaxial braiding at +/−45 deg or based on the contours involved);
   b. Heat 0 degree (uniaxial) plies to a softened state (to T<Tg);
   c. Lay 0 degree plies 804 (e.g., unidirectional tape) over the mandrel 802, slitting 818 the plies (e.g., one sided slitting with opposite side having a full layer) over the tight mandrel radii, and then tacking (e.g., tacking to form spot-welds 806 and optional spot-welds 808 using a welding iron) the ends 812 of the uniaxial plies over underlying plies (i.e., layers 800) to hold the plies 804 together and/or maintain a position thereof over the underlying plies (i.e., layers 800). While the plies 804 in some examples are tacked in place by spot-welding, in some examples the plies 804 are held in place with a thin filament of polymer pre-preg woven around the uniaxial plies, which can be bound or constrained. In some examples, a PI-film is used to reduce the likelihood of damage caused by interaction with sharp edges of the consolidate part. Also, in some examples, one-sided tacking is used wherein a transition zone 816 is untacked to allow for increased deformability during cold conditions.
   d. The maximum number of plies moldable in a single step is based on the limitation of aspect ratio of the braiding mandrel diameter (D) versus the laminate thickness (T) (e.g., in the order of 4 to 20 plies at a time in some examples). It should be noted that the one or more steps of the laying process can be automatically performed, manually performed, or a combination of both.
2. Secure one or more patches 900 of uniaxial or braided material over one or more transition sections 904, and spot-welding the one or more patches 900 on the edge 902 where the one or more patches 900 will first contact a subsequent braided layer (e.g., spot-weld patch on the edge 902 where the patch 902 first makes contact with the overlaying braid, namely the two or more layers 800). It should be noted that a single patch 900 is shown for ease in illustration. When multiple patches 900 are used, in some examples, adjacent patches 900 overlap each other by one to three inches, such as to meet structural requirements for load transition. In some examples, the patches 900 are arrange concentrically where greater thickness is desired than could otherwise be applied in one application.
3. Consolidation as described in more detail herein
4. Inspection as described in more detail herein. For example, one or more non-destructive inspection (NDI) processes can be used to measure wall thickness of the part to determine any varying wall thickness due to longitudinal and circumferential ply drops, which confirms what was designed into the part and can also be used as part of the aspect ratio calculation. Other inspections are performed in some examples, such as a surface quality inspection to identify any wrinkles, etc. and/or a laminate quality inspection to identify any locking of preform stacks in transition sections, wrinkles, etc.

Figure 10:
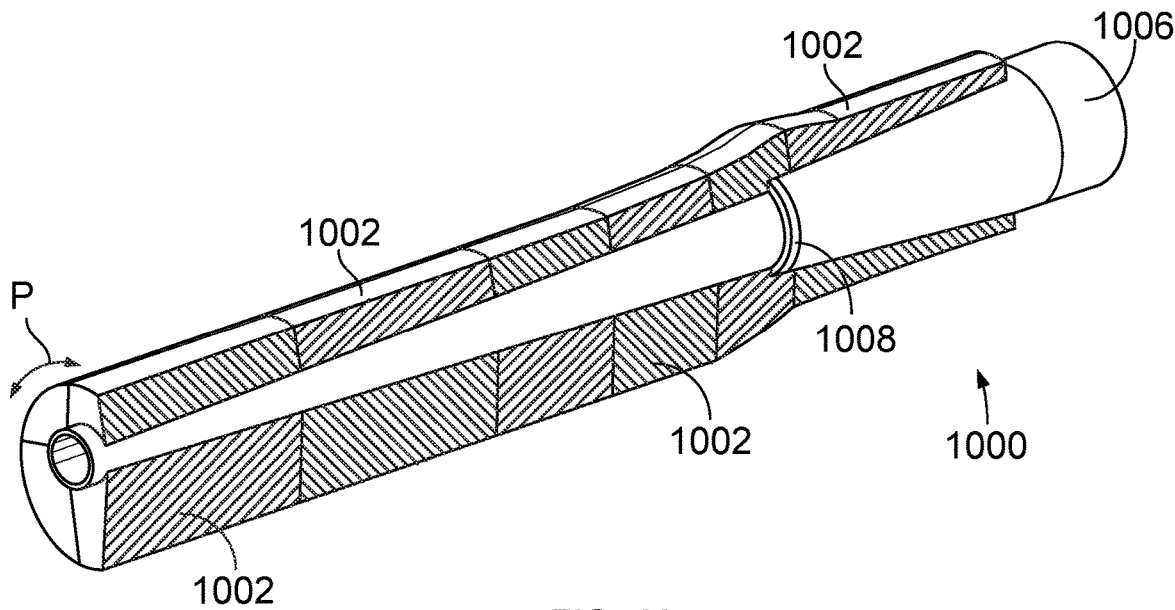
FIG. 10 illustrates a cross-section of a mandrel in accordance with an implementation.

In some examples, the preform layup is formed on a mandrel 1000 as shown in FIG. 10. In this example, the mandrel 1000 is a near-net shape mandrel for braiding thermoplastics. That is, the mandrel 1000 is a multi-part or segmented mandrel having a plurality of sections 1002 that define different segments of the mandrel 1000. As can be seen, the mandrel 1000 includes sections 1002 with section shapes that vary along the mandrel length, but maintain a near-constant (substantially constant) section perimeter (P). In one example, the mandrel 1000 is a multi-part braiding mandrel 1000 formed from sections 1002 that are metal parts (e.g., to allow for welding). In some examples, each section 1002 is a separate part that is joined together in series to form the entire mandrel. It should be appreciated that different sections can be combined or included in series to form various mandrels configurations.

In some examples, the mandrel sections 1002 are held securely by a central conical spine 1006 with a stepped section (e.g., transition section) formed by a step 1008, such that the combination of the conical spine 1006 and step 1008 hold the mandrel sections 1002 firmly together. That is, the mandrel sections 1002 are maintained in abutting engagement along the conical spine 1006. In some examples, a near-net shape mandrel at the D-shaped cross-section is provided that reduces the demoldability of the preform due to undercuts. It should be noted that mandrel sections 1002 having different shapes or configurations can be used and spines have different shapes or configurations can be used. Additionally, in some examples, a retaining mechanism (not shown) can be provided at the distal tapered end or each section 1002 can have a retaining mechanism.

In some examples, a straight braiding mandrel is used with local thickening, which can be integral to the mandrel or added upon the mandrel. In these examples, the unidirectional layer integration includes partially slitted layers as described herein to ensure draping flexibility in the transition sections.

Figure 11:
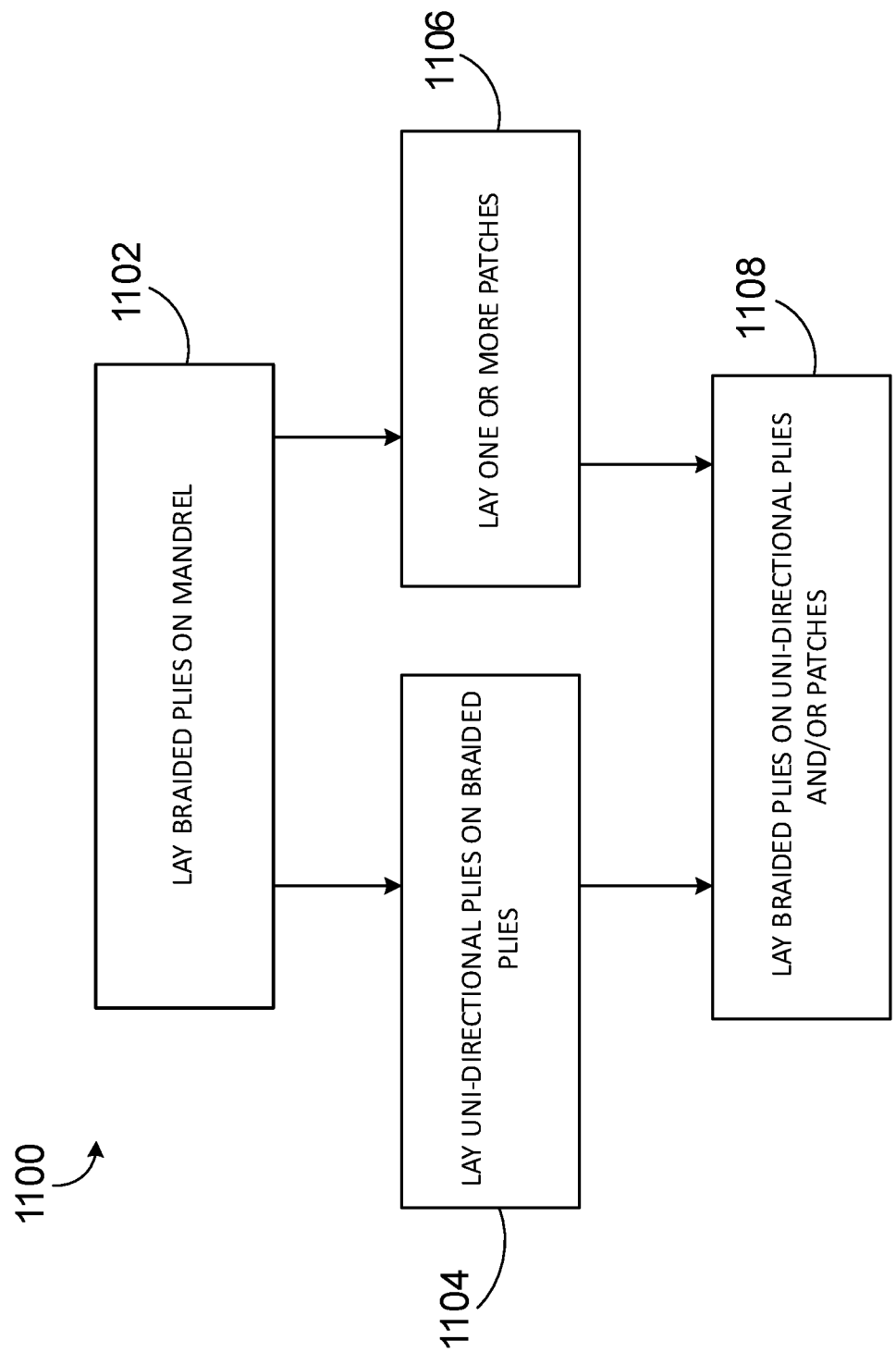
FIG. 11 is a flow chart illustrating a method for manufacturing a thermoplastic preform according to an implementation.

FIG. 11 is a flow chart of a method 1100 for manufacturing a thermoplastic preform, such as for use in forming a complex part in accordance with one or more examples. The method 1100 can be implemented, for example, to assemble one or more parts of an aircraft. It should be noted that the steps in the method 1100 can be performed in a different order than shown, one or more steps can be added or removed, and the steps can be performed concurrently, simultaneously or sequentially.

The method 1100 includes laying braided plies (e.g., thermoplastic braided plies) on a mandrel at 1102. In some examples, an initial uni-directional ply placement is present and braiding performed thereon. For example, one or more layers of braided layers are formed on the mandrel using a winding process as described herein. However, any suitable process can be used to lay the one or more layers of braided layers. Different sized braiders can be used having different braiding angles. In some examples, the one or more layers of braided layers are formed using +/−forty degree plies. In other examples, the one or more layers of braided layers are formed using +/−seventy degree plies to better match the mandrel contours while maintaining a desired thickness. As should be appreciated, other (braiding angles are contemplated and can be used.

In some examples, laying braided plies on a mandrel at 1102 includes overbraiding the mandrel with a continuous fiber thermoplastic composite material over an exterior surface of the mandrel, such as in the form of a tubular mandrel, to form an overbraided mandrel, such as described in U.S. Pat. No. 9,174,393. In some examples, the continuous fiber thermoplastic composite material is one of a carbon fiber composite material; carbon fiber reinforced polymer material including carbon fiber reinforced polypheylene sulfide (PPS), carbon fiber reinforced polyetheretherketone (PEEK), carbon fiber reinforced polyetherketoneketone (PEKK), and carbon fiber reinforced polyethyleneimine (PEI); nylon, or another suitable thermoplastic composite material. The continuous fiber thermoplastic composite material in some examples is a continuous slit tape thermoplastic composite material, a prepreg unidirectional tape, a prepreg fabric (not shown), a commingled fiber material, a quasi-isotropic or anisotropic continuous fiber thermoplastic composite material, or another suitable continuous fiber thermoplastic composite material. The continuous fiber thermoplastic composite material is wound and/or braided around the mandrel in a bias direction (B) (or a zero (0) degree direction in some examples to form a unidirectional ply layer). When the continuous fiber thermoplastic composite material is wound or braided in a bias direction (B), the commingled fiber material can be used so that when the continuous fiber thermoplastic composite material is heated and consolidated, the embedded resin powder (not shown) fills the dry fibers and melts to result in a consolidated thermoplastic composite tubular structure. It should be noted that the continuous fiber thermoplastic composite material in various examples can have different thicknesses, gauges, bias angles along the length, cross-sectional shapes, cross-sectional angular paths along the length, curves, shapes of drop, and number of tows.

In some examples, one or more unidirectional plies (e.g., thermoplastic unidirectional plies) are laid on the one or more layers of braided layers at 1104. For example, one or more pieces of unidirectional tape are tacked onto the one or more layers of braided layers. The tacking holds the one or more pieces of unidirectional tape at a desired contour until final consolidation or curing. In some examples, the method 1100 includes laying one or more patches at transition sections at 1106. It should be noted that the one or more patches can be braided or unidirectional patches. It also should be noted that the one or more patches can be laid on the one or more layers of braided layers and/or on the one or more unidirectional plies. In some examples, the laying of the one or more patches at transition sections at 1106 is optionally performed and/or can be performed at other sections.

One or more layers of braided plies are then laid on the stack at 1108. That is, one or more layers of braided plies are laid on the one or more unidirectional plies and/or the one or more braided or unidirectional patches. One or more of the unidirectional plies and one or more of the braided or unidirectional patches can be laid in the same layer with one or more layers of braided plies laid thereon. It should be noted that one or more layers can be fixed in place by, for example, one-sided tacking or overbraiding. It should be appreciated that patches can be positioned or placed outside of the braiding in some examples.

The steps of the method 1100 are repeated to assemble a desired or required thermoplastic preform, and in various examples, the thermoplastic preform can be consolidated using different consolidation processes. For example, a multi-step consolidation process is performed in some examples using a plurality of thermoplastic preforms that includes pre-consolidation of multiple thermoplastic preform stacks (e.g., two stacks of twenty-two layers each) and then co-consolidation of the consolidated thermoplastic preform stacks with other thermoplastic preform stacks. It should be noted that any consolidation process can be used with different operating parameters. In one example, a pressure application of 7.3 psi (0.5 bar) is used during heat-up with a dwell time when reaching 608 degrees Fahrenheit (320 degrees Celsius). Slow pressure application is then performed when reaching 700 degrees Fahrenheit (371 degrees Celsius). Then a dwell time of fifteen minutes results in consolidation. It should be appreciated that different parameters, such as temperatures, operating times, etc. can be used as desired or needed.

Thus, a layup is formed that defines a thermoplastic preform that allows for forming of different thermoplastic parts, such as parts with a complex geometry. For example, a complex blade geometry having a curved centroid line and with D-shaped and circular cross-sections is formed. Various examples provide, for example, a unique way of combining non-traditional fiber orientation using braiding and interleaved unidirectional tapes. Various examples also solve issues of creating complex lay-ups, as well as consolidation of a pre-stacked lay-up as described herein.

Figure 12:
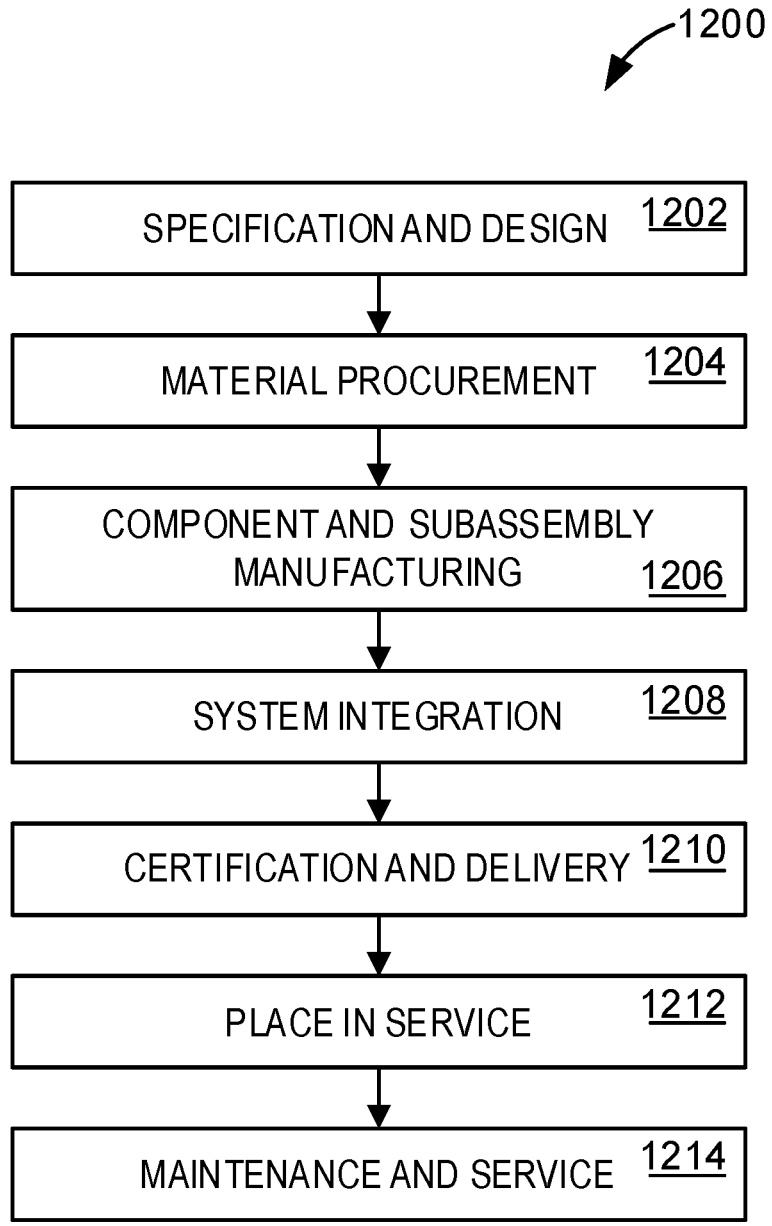
FIG. 12 is a block diagram of an apparatus production and service method that advantageously employs various implementations.

Examples of the disclosure can be described in the context of an aircraft manufacturing and service method 1200 as shown in FIG. 12. During pre-production, illustrative method 1200 can include specification and design 1202 of an aircraft and material procurement 1204. During production, component and subassembly manufacturing 1206 and system integration 1208 of the aircraft take place. Thereafter, the aircraft can go through certification and delivery 1210 to be placed in service 1212. While in service by a customer, the aircraft is scheduled for routine maintenance and service 1214 (which can also include modification, reconfiguration, refurbishment, and so on).

Each of the processes of the illustrative method 1200 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as the automotive industry.

Apparatus and methods shown or described herein can be employed during any one or more of the stages of the manufacturing and service method 1200. For example, components or subassemblies corresponding to component and subassembly manufacturing 1206 can be fabricated or manufactured in a manner similar to components or subassemblies produced while the aircraft is in service. Also, one or more aspects of the apparatus, method, or combination thereof can be utilized during the production states of subassembly manufacturing 1206 and system integration 1208, for example, by substantially expediting assembly of or reducing the cost of the aircraft. Similarly, one or more aspects of the apparatus or method realizations, or a combination thereof, cab be utilized, for example and without limitation, while the aircraft is in service, e.g., maintenance and service 1214.

Figure 13:
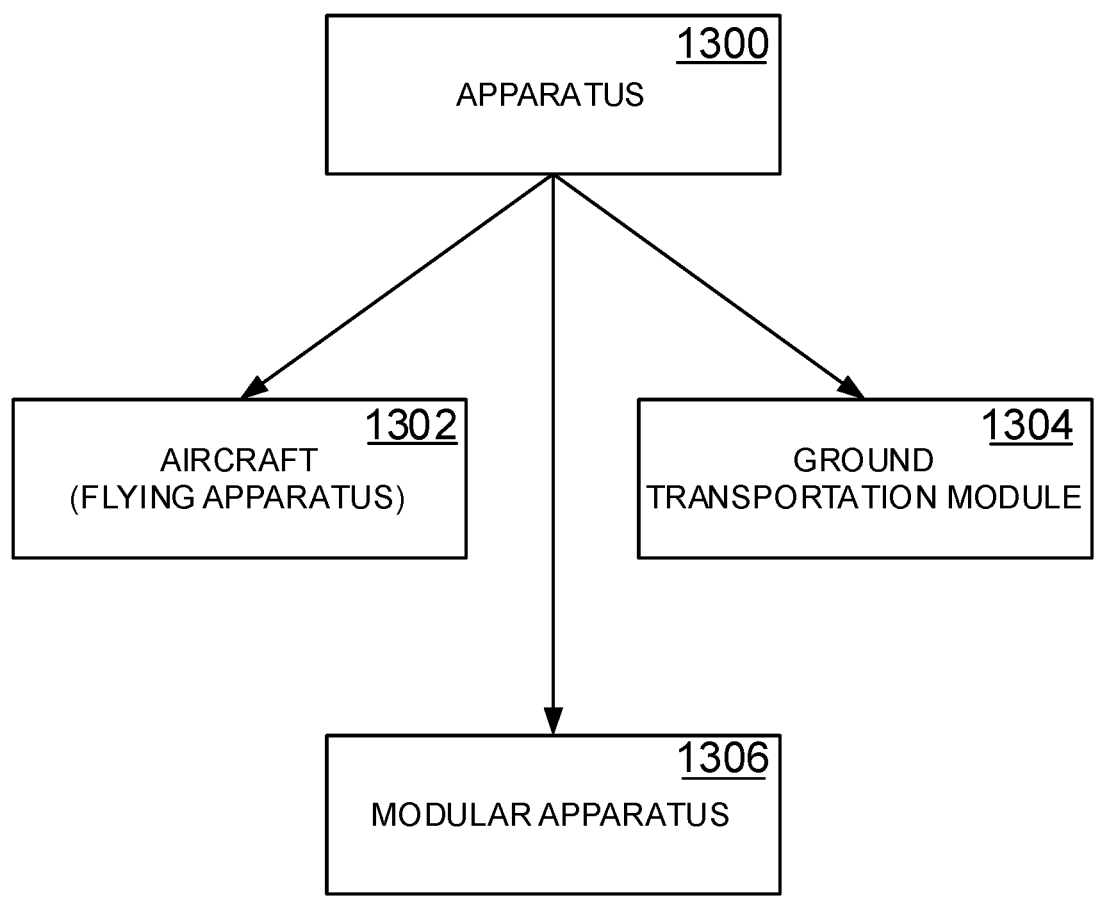
FIG. 13 is a block diagram of an apparatus for which various aspects of the disclosure may be advantageously employed.

With reference now to FIG. 13, an apparatus 1300 is provided. As shown in FIG. 13, an example of the apparatus 1300 is a flying apparatus 1302, such as an aerospace vehicle, aircraft, helicopter, air cargo, flying car, earth-orbiting satellite, planetary probe, deep space probe, solar probe, and the like. As also shown in FIG. 13, a further example of the apparatus 1300 is a ground transportation apparatus 1304, such as an automobile, a truck, heavy equipment, construction equipment, a boat, a ship, a submarine and the like. A further example of the apparatus 1300 shown in FIG. 13 is a modular apparatus 1306 that comprises at least one or more of the following modules: an air module, a payload module and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

Figure 14:
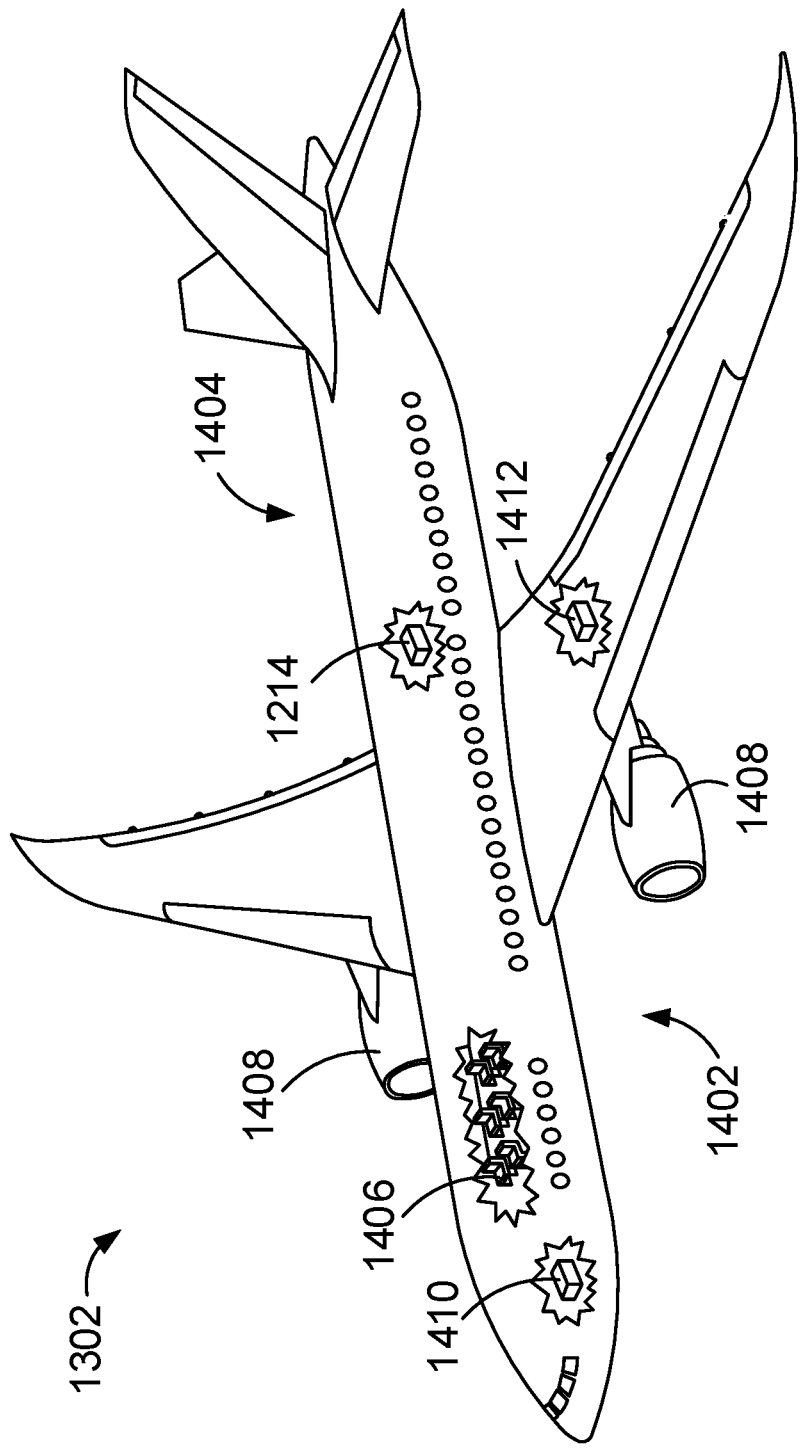
FIG. 14 is a schematic perspective view of a flying apparatus.

With reference now to FIG. 14, a more specific diagram of the flying apparatus 1302 is depicted in which an implementation of the disclosure is advantageously employed. In this example, the flying apparatus 1302 is an aircraft produced by the apparatus manufacturing and service method 1200 in FIG. 12 and includes an airframe 1402 with a plurality of systems 1404 and an interior 1406. Implementations of the plurality of systems 1404 include one or more of a propulsion system 1408, an electrical system 1410, a hydraulic system 1412, and an environmental system 1414. However, other systems are also candidates for inclusion. Although an aerospace example is shown, different advantageous examples are applied to other industries, such as the automotive industry, etc.

Thus, various examples facilitate manufacture of a thermoplastic structure. The various examples can be implemented using different manufacturing environments.

One or more examples can be implemented in an automated system that includes a computing device. In some examples, the computing device includes one or more processors, one or more presentation components and the memory. The disclosed examples associated with the computing device are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc.

In one example, the memory includes any of the computer-readable media discussed herein. In one example, the memory is used to store and access instructions configured to carry out the various operations disclosed herein, such as controlling the braiding process. In some examples, the memory includes computer storage media in the form of volatile and/or nonvolatile memory, removable or non-removable memory, data disks in virtual environments, or a combination thereof. In one example, the processor(s) includes any quantity of processing units that read data from various entities, such as the memory 902 or input/output (I/O) components. Specifically, the processor(s) are programmed to execute computer-executable instructions for implementing aspects of the disclosure. In one example, the instructions are performed by the processor, by multiple processors within the computing device, or by a processor external to the computing device 900. In some examples, the processor(s) are programmed to execute instructions such as those illustrated in the flow charts discussed below and depicted in the accompanying drawings.

The presentation component(s) present data indications to an operator or to another device. In one example, presentation components include a display device, speaker, printing component, vibrating component, etc. One skilled in the art will understand and appreciate that computer data is presented in a number of ways, such as visually in a graphical user interface (GUI), audibly through speakers, wirelessly between the computing device, across a wired connection, or in other ways.

In one example, presentation component(s) are not used when processes and operations are sufficiently automated that a need for human interaction is lessened or not needed. I/O ports allow the computing device to be logically coupled to other devices including the I/O components, some of which is built in. Examples of the I/O components include, for example but without limitation, a microphone, keyboard, mouse, joystick, game pad, satellite dish, scanner, printer, wireless device, etc.

The computing device includes a bus that directly or indirectly couples the following devices: the memory, the one or more processors, the one or more presentation components, the input/output (I/O) ports, the I/O components, a power supply, and a network component. The computing device should not be interpreted as having any dependency or requirement related to any single component or combination of components illustrated therein. The bus represents one or more busses (such as an address bus, data bus, or a combination thereof).

In some examples, the computing device is communicatively coupled to a network using the network component. In some examples, the network component includes a network interface card and/or computer-executable instructions (e.g., a driver) for operating the network interface card. In one example, communication between the computing device and other devices occur using any protocol or mechanism over a wired or wireless connection. In some examples, the network component is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network personal computers (PCs), minicomputers, mainframe computers, distributed computing environments that include any of the above systems or devices, virtual reality (VR) devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects and implementations of the disclosure.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one implementation" are not intended to be interpreted as excluding the existence of additional implementations that also incorporate the recited features. The term "exemplary" is intended to mean "an example of".

When introducing elements of aspects and implementations of the disclosure or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the disclosure without departing from their scope. While the dimensions and types of materials described herein are intended to define the parameters of the various implementations of the disclosure, the implementations are by no means limiting and are example implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for manufacturing a thermoplastic rotor blade structure, the method comprising:
   laying a first plurality of braided plies on a mandrel, wherein the mandrel comprises a plurality of sections with section shapes that vary along a length of the mandrel, and wherein the mandrel comprises a transition section located between a first section and a second section of the plurality of sections;
   laying one or more unidirectional plies on the first plurality of braided plies;
   laying a second plurality of braided plies on the one or more unidirectional plies; and
   laying one or more patches on one or more of the first plurality of braided plies or the one or more unidirectional plies at the transition section.

2. The method of claim 1, wherein the one or more patches comprise one or more braided patches.

3. The method of claim 1, wherein the one or more patches comprise one or more unidirectional patches.

4. The method of claim 1, further comprising spot-welding the one or more patches on an edge where the one or more patches first contact a subsequent braided layer of the second plurality of braided plies.

5. The method of claim 4, further comprising tack welding the one or more unidirectional plies on the first plurality of braided plies, wherein the tack welding comprises tack welding only one end of the one or more unidirectional plies on the first plurality of braided plies.

6. The method of claim 4, further comprising performing an interleaving of the first braided plies and the one or more unidirectional plies.

7. The method of claim 4, further comprising heating the one or more unidirectional plies before laying the one or more unidirectional plies on the plurality of braided plies.

8. The method of claim 4, further comprising performing consolidation after one or more of the layings and inspecting the consolidation.

9. The method of claim 1, wherein the one or more unidirectional plies comprise unidirectional tape having slitting.

10. The method of claim 1, further comprising tack welding the one or more unidirectional plies on the first plurality of braided plies, wherein the tack welding comprises tack welding only one end of the one or more unidirectional plies on the first plurality of braided plies.

11. The method of claim 1 wherein the mandrel comprises one or more uni-directional plies thereon.

12. The method of claim 1, further comprising performing an interleaving of the first braided plies and the one or more unidirectional plies.

13. The method of claim 1, further comprising heating the one or more unidirectional plies before laying the one or more unidirectional plies on the plurality of braided plies.

14. The method of claim 1, further comprising performing consolidation after one or more of the layings and inspecting the consolidation.

15. The method of claim 1, further comprising:
   spot-welding the one or more patches on an edge where the one or more patches first contact a subsequent braided layer of the second plurality of braided plies;
   tack welding the one or more unidirectional plies on the first plurality of braided plies, wherein the tack welding comprises tack welding only one end of the one or more unidirectional plies on the first plurality of braided plies;

performing an interleaving of the first braided plies and the one or more unidirectional plies;

heating the one or more unidirectional plies before laying the one or more unidirectional plies on the plurality of braided plies; and performing consolidation after one or more of the layings and inspecting the consolidation.

16. The method of claim 15, wherein the one or more patches comprise one or more braided patches and one or more unidirectional patches, wherein the one or more unidirectional plies comprise unidirectional tape having slitting, and wherein the mandrel comprises one or more unidirectional plies thereon.

17. The method of claim 1, wherein the one or more patches comprise one or more braided patches and one or more unidirectional patches.

18. The method of claim 1, wherein the one or more unidirectional plies comprise unidirectional tape having slitting and wherein the mandrel comprises one or more unidirectional plies thereon.

19. The method of claim 1, wherein the one or more patches comprise one or more braided patches, wherein the one or more unidirectional plies comprise unidirectional tape having slitting, and wherein the mandrel comprises one or more unidirectional plies thereon.

20. The method of claim 1, wherein the one or more patches comprise one or more unidirectional patches, wherein the one or more unidirectional plies comprise unidirectional tape having slitting, and wherein the mandrel comprises one or more unidirectional plies thereon.

* * * * *